(12) United States Patent
Jeong

(10) Patent No.: US 7,023,644 B2
(45) Date of Patent: Apr. 4, 2006

(54) METHOD OF RECORDING SERVO DATA

(75) Inventor: Woo-cheol Jeong, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 274 days.

(21) Appl. No.: 10/253,714

(22) Filed: Sep. 25, 2002

(65) Prior Publication Data

US 2003/0067707 A1 Apr. 10, 2003

(30) Foreign Application Priority Data

Sep. 25, 2001 (KR) ................ 2001-59346

(51) Int. Cl.
*G11B 21/10* (2006.01)
(52) U.S. Cl. ........................................ 360/75
(58) Field of Classification Search .............. 360/75, 360/48, 76, 77.02, 77.08, 78.04
See application file for complete search history.

(56) References Cited

U.S. PATENT DOCUMENTS

| | | | | |
|---|---|---|---|---|
| 4,945,427 A | * | 7/1990 | Cunningham | ................ 360/75 |
| 5,909,336 A | | 6/1999 | Schaffer et al. | |
| 5,940,237 A | * | 8/1999 | Takagi | .......................... 360/75 |
| 6,002,540 A | | 12/1999 | Cunningham et al. | |
| 6,005,725 A | * | 12/1999 | Emo et al. | ..................... 360/31 |
| 6,043,951 A | | 3/2000 | Lee | |
| 6,084,731 A | | 7/2000 | Uchida et al. | |
| 6,151,187 A | * | 11/2000 | Ogawa | ..................... 360/78.14 |
| 6,320,718 B1 | | 11/2001 | Bouwkamp et al. | |
| 6,611,395 B1 | * | 8/2003 | Chainer et al. | ................ 360/75 |
| 6,765,744 B1 | * | 7/2004 | Gomez et al. | ................. 360/75 |
| 6,778,343 B1 | * | 8/2004 | Nunnelley | ..................... 360/76 |
| 6,798,592 B1 | * | 9/2004 | Codilian et al. | ............. 360/48 |

FOREIGN PATENT DOCUMENTS

| | | |
|---|---|---|
| EP | 1 220 207 | 7/2002 |
| JP | 10-50014 | 2/1998 |
| JP | 2000-268516 | 9/2000 |
| JP | 2001-143416 | 5/2001 |

* cited by examiner

*Primary Examiner*—David Hudspeth
*Assistant Examiner*—James L Habermehl
(74) *Attorney, Agent, or Firm*—Staas & Halsey LLP

(57) ABSTRACT

A method of recording servo data on a high-density disc while an actuator head rotates within a predetermined skew angle. The servo data is recorded on the hard disc by varying the rotation angle of the actuator head according to the predetermined skew angle of the actuator head.

4 Claims, 3 Drawing Sheets

METHOD OF RECORDING SERVO DATA

CROSS-REFERENCE TO RELATED APPLICATIONS

This application claims the benefit of Korean Application No. 2001-59346, filed Sep. 25, 2001, in the Korean Industrial Property Office, the disclosure of which is incorporated herein by reference.

BACKGROUND OF THE INVENTION

1. Field of the Invention

The present invention relates to a method of recording servo data on a high-density data recording medium, and more particularly, to a method of recording servo data on a hard disc on which high-density data can be recorded.

2. Description of the Related Art

Conventional methods of moving an actuator head in a hard disc drive (HDD) include a method using a stepping motor and a method using a voice coil motor.

The method using a stepping motor is usually used in a floppy disc drive (FDD) and is a method of moving a head in separated increments between tracks through a stepping motor.

Unlike in the method using a stepping motor, the method using a voice coil motor is a method of moving a head according to a special signal called a servo signal on a platter.

In a general hard disc, the entire surface of the platter is used to process the servo signal, and the hard disc has an extra head to read the servo signal. This case is referred to as a method using only a servo signal.

A more conventional method is a servo-signal insertion method. In the servo-signal insertion method, a servo signal is considered as one data and stored on a part of the surface of a platter. Accordingly, in the servo-signal insertion method, all platters in a hard disc drive system may be used for data storage. Thus, a head to read/write data in the servo-signal insertion method must read a servo signal.

In the method using a voice coil motor, a head can access a platter more accurately than that of the method using a stepping motor, and the head access time can be also reduced. In particular, in the servo-signal insertion method, an off-track can be modified in real-time, the surface of a hard disc can be used for various applications, and there is no interference between a servo head and a data head.

The servo signal in the method using a voice coil motor is obtained from servo data, which is recorded on a platter. The servo data includes patterns related to track data that are engraved when the HDD is manufactured on the surface of the platter to check the position of the head. In this case, the servo data is recorded on the surface of the platter while the head is rotated at a predetermined angle.

However, when the servo data is recorded on a hard disc using a voice coil motor, an angle that is formed by an extension line of a head actuator and a normal line of a track is varied according to a skew angle. That is, the skew angle is varied in accordance with regions in the direction of a radius of the hard disc on which servo data is recorded. In addition, the track density in an outer data region (hereinafter, referred to as an OD region) in the circumference of the hard disc is relatively higher than other regions of the hard disc. For example, the recording density in a position where the skew angle is 0 is about 57,000 tracks per inch (TPI), whereas the recording density in the OD region is about 60,000 TPI.

Under these circumstances, when the servo data is recorded on a hard disc through conventional methods of recording servo data, several problems occur as follows. When the servo data is recorded in a region where the skew angle of the hard disc is relatively large, for example, the OD region, servo bursts overlap. Specifically, when the servo data is recorded in a region where the skew angle of the hard disc is 0, for example, an inner data region (hereinafter, referred to as an ID region) of the hard disc, overlap does not occur between servo bursts B1 and B2 that are recorded in servo burst regions A and B of adjacent tracks, as illustrated in FIG. 1. However, when the servo data is recorded in the OD region of the hard disc, servo bursts B3 and B4 that are recorded in the servo burst regions A and B of the adjacent tracks overlap, as illustrated in FIG. 2. In this case, the absolute value of a position error signal (PES), which is used for position control by the servo control, becomes relatively small, and thus, the possibility of determining an off-track decreases.

That is, in the case of an on-track, as shown in Equations 1 and 2, the value of the PES is 0 in either case.

$$PES = \frac{(A-B)}{(A+B)} = \frac{(0.4T - 0.4T)}{(0.4T + 0.4T)} = 0 \quad (1)$$

$$PES = \frac{A+d-B-d}{A+d+B+d} = \frac{(0.4T+0.1T-0.4T-0.1T)}{(0.4T+0.1T+0.4T+0.1T)} = 0 \quad (2)$$

Meanwhile, when an off-track of 10% exists, as shown in Equation 3, the value of the PES is 0.25 when the servo bursts are normally recorded on the adjacent tracks. However, as shown in Equation 4, the value of the PES is 0.20 when the servo bursts overlap.

$$PES(\text{off} - \text{track } 10\%) = \frac{(A+0.1T-B+0.1T)}{(A+0.1T+B-0.1T)} = \frac{0.2T}{0.8T} = 0.25 \quad (3)$$

$$PES(\text{off} - \text{track } 10\%) = \quad (4)$$
$$\frac{(A+0.1T+0.1T-B-0.1T+0.1T)}{(A+0.1T+0.1T+B+0.1T-0.1T)} = \frac{0.2T}{1.0T} = 0.2$$

The values of the servo bursts in the regions A and B as shown in Equations 1 through 4 are 0.4T, and a value d by which the servo bursts deviate from a servo burst space D1 in the region where the servo bursts overlap is 0.1 T.

In this way, the value of the PES in the region where the servo bursts overlap cannot represent an off-track which actually occurs, resulting in defects when the data is recorded on the hard disc, or when the data is read from the hard disc.

SUMMARY OF THE INVENTION

Accordingly, it is an object of the present invention to provide a method of recording servo data on a hard disc, in which the track density is optimized in accordance with regions of the hard disc, thereby preventing servo bursts from overlapping between adjacent tracks and preventing defects thereof when servo data is recorded in each region of the hard disc.

The present invention also provides a recording medium. In the recording medium including an Inner data region and an outer data region in which a plurality of servo patterns are formed in a servo burst space along a track, on the recording medium high-density data can be recorded, in the outer data region, the maximum size of the servo patterns is the same as the size of the servo burst space.

The present invention also provides a hard disc driver. In the hard disc driver comprising a recording medium on which high-density data are recorded, and an actuator head for recording high-density data on the recording medium within a predetermined skew angle, the recording medium includes an inner data region and an outer data region in which a plurality of servo patterns are formed in a servo burst space along a track, and in the outer data region, the maximum size of the servo patterns is the same as the size of the servo burst space.

Additional objects and advantages of the invention will be set forth in part in the description which follows and, in part, will be obvious from the description, or may be learned by practice of the invention.

The foregoing and other objects of the present invention are achieved by providing a method of recording servo data in which the servo data are recorded on a high-density disc while rotating an actuator head within a predetermined skew angle, wherein the servo data is recorded on the hard disc by varying the rotation angle of the actuator head according to the skew angle of the actuator head.

Here, the method further includes dividing the hard disc into a plurality of intervals in the direction of a radius of the hard disc and calculating an optimum track density (tracks per inch; TPI) at each interval, determining the rotation angle of the actuator head at each interval such that the track density at each interval coincides with the calculated optimum track density, and rotating the actuator head at the determined rotation angle and recording the servo data at each interval.

The rotation angle of the actuator head is increased at the interval where the skew angle of the actuator head is large and decreased at the interval where the skew angle of the actuator head is small, and then the servo data is recorded.

The rotation angle of the actuator head is sequentially reduced when the servo data is recorded from an outer data (OD) region of the hard disc to an inner data (ID) region of the hard disc, and the rotation angle of the actuator head is sequentially increased in an opposite case.

According to an aspect of the present invention, the servo data can be recorded in each region of the hard disc such that an optimized track pitch is obtained. This means that a head margin for each region can be uniformly obtained. Thus, after the servo data is recorded, defects occurring when conventional methods of recording servo data are used, or when the data recorded on the disc is read, for example, an increase in the PES value due to servo bursts overlap between adjacent tracks caused by a narrow track pitch in the OD region of the hard disc, can be omitted.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
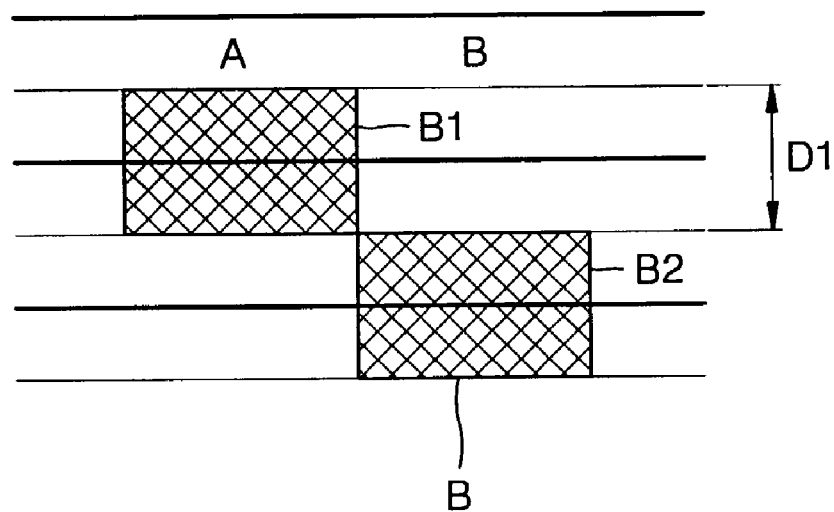
FIG. 1 is a sectional plane view illustrating a case where servo bursts are normally recorded in a conventional method of recording servo data.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
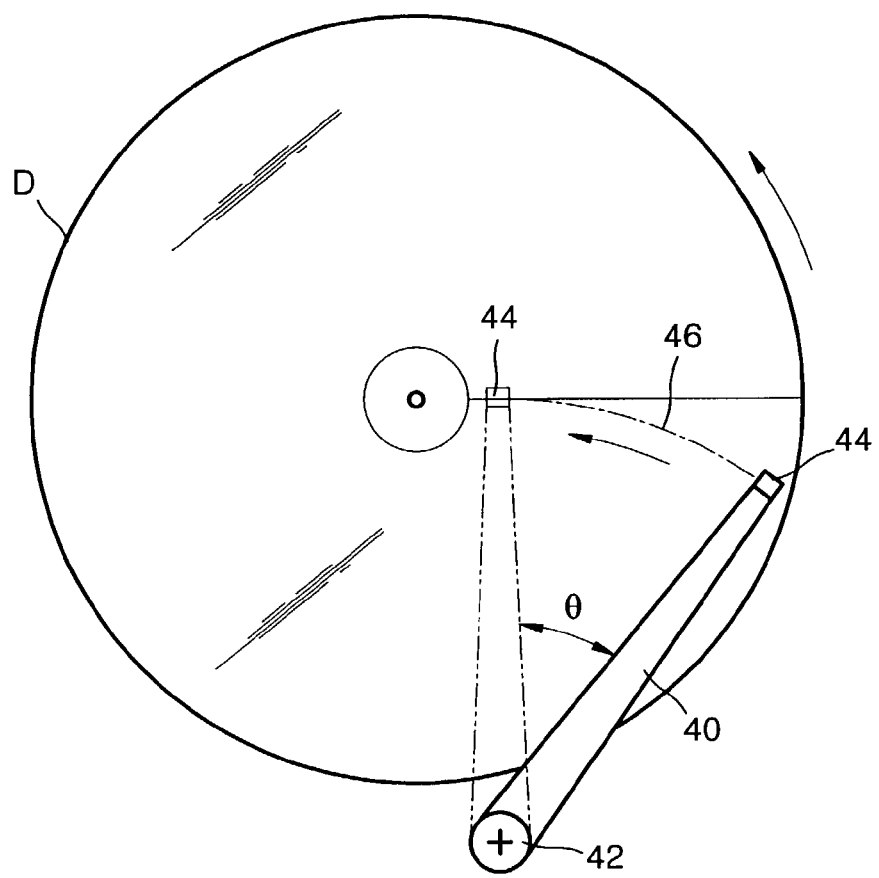
FIGS. 3 and 4 is a plane view and a sectional extended plane view, respectively, of a hard disc illustrating a method of recording servo data according an embodiment of the present invention.

As illustrated in FIG. 3, servo data is recorded on a hard disc D by a head 44, which is mounted at the end of an actuator 40 which moves on the basis of a pivot 42. The actuator 40 rotates the head 44 at a predetermined skew angle $\theta$, and thus, predetermined servo data is recorded on the hard disc D along a track.

The servo data may be recorded while the head 44 is rotated in a clockwise or counterclockwise direction. For the sake of convenience, the servo data is assumed here to be recorded on the disc D while the head 44 is rotated in a counterclockwise direction.

Figure 2:
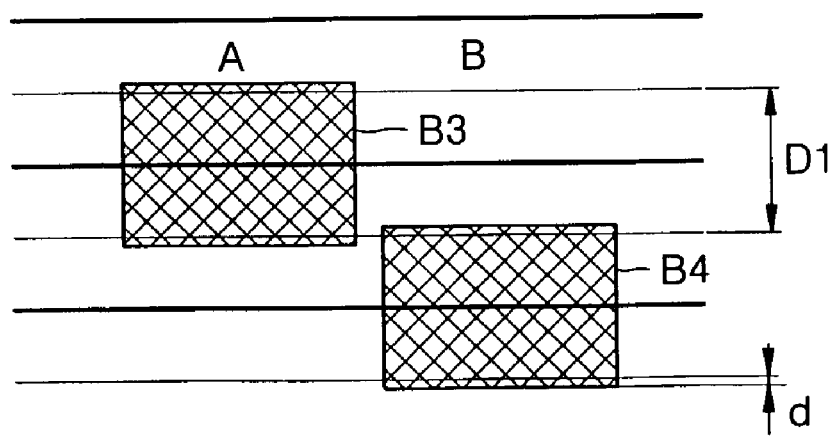
FIG. 2 is a sectional plane view illustrating a case where the servo bursts recorded on adjacent tracks overlap in the conventional method of recording servo data.
Figure 4:
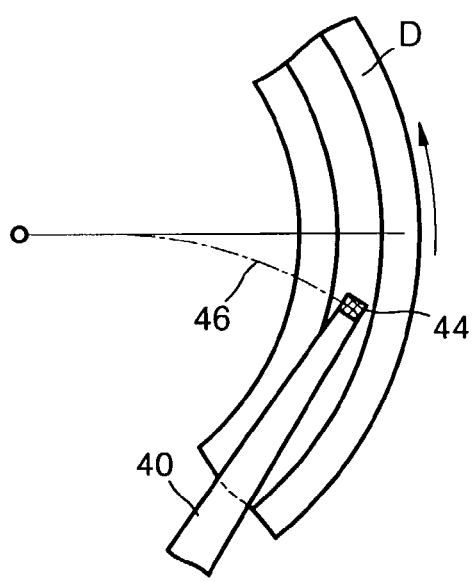
Figure 5:
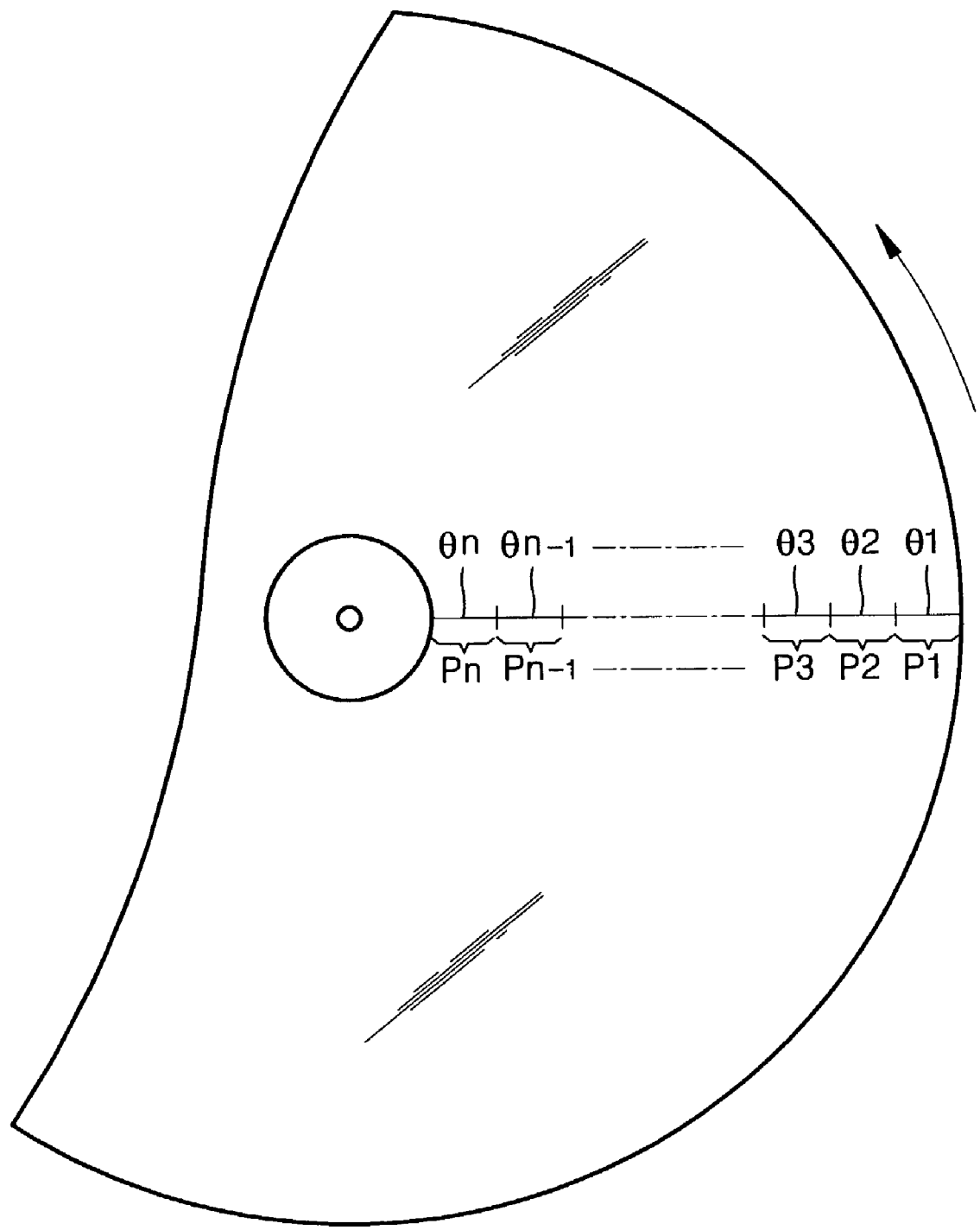
FIG. 5 is a plane view illustrating a case where the disc is divided into a plurality of intervals and the rotation angle of a head is varied in accordance with each interval.

When the actuator 40 reaches the innermost part of the disc D, a predetermined skew angle $\theta$ of the actuator 40 is 0, that is, the longitudinal axis of the actuator 40 and the normal line to the innermost track at the point where the actuator 40 reaches the track are perpendicular to each other. The locus of the head 44 on the hard disc D follows a dotted line 46. When the head 44 is rotated by equal angles along the dotted line 46, the head 44 inside the perimeter of the disk D is rotated to be perpendicular to the track at the point where it touches the track, and thus is moved accurately by the length corresponding to a track pitch. However, the head 44 in the outer part of the hard disc D, as illustrated in FIG. 4, is rotated while crossing the track obliquely, and thus is moved by the length smaller than the track pitch. As a result, when the servo data is recorded on the hard disc D, the track pitch from the outer part of the hard disc D is recorded on a narrower portion than the track pitch inside of the hard disc D, that is, the track density (tracks per inch; TPI) in the outer part of the hard disc D is higher than in the inner part of the hard disc D, and a servo burst, among other things recorded on the disc D as the servo data, overlaps a servo burst at another adjacent track (see FIG. 2). Thus, as illustrated in FIG. 5, it is preferable that the track on the disc D is divided into a plurality of intervals along the direction of the radius of the disc D, and the servo data is recorded on the hard disc D during the rotation of the head 44 in accordance with each of the divided intervals. However, in general, the servo data is recorded on the hard disc D during the rotation of the head 44 at a constant predetermined rotation angle within the track intervals.

Specifically, when the track on the hard disc D is divided into first through n-th intervals P1, P2, P3, . . . , Pn-1, Pn along the radius of the hard disc D, at the first interval P1, the head 44 is rotated uniformly at a first rotation angle $\theta1$, at the second interval P2, the head 44 is rotated uniformly at the first rotation angle $\theta1$ plus a second rotation angle $\theta2$, and so on. In this manner, for different intervals, the head 44 is rotated at different rotation angles.

As described above, when the head 44 is moved at equal angles for all of the intervals of the hard disc D, the movement distance of the head 44 in the outer part of the disc D, where the skew angle of the head 44 is the largest, does not reach a track pitch value. Thus, in order to accurately conform the movement distance of the head 44 in the outer part of the hard disc D to the track pitch value, the movement speed of the head 44 in the outer part of the hard disc D, and implicitly, the rotation angle of the head 44, is preferably larger than the movement speed of the head 44 in the inner part of the hard disc D. As a result, the first rotation angle $\theta 1$, which determines the rotation angle of the head 44 at the first interval P1 of the hard disc D, is preferably larger than the rotation angles at the other intervals. That is, preferably, the rotation angle of each interval becomes smaller from the first interval P1 to the n-th interval Pn.

When the servo data is recorded from the inside of the hard disc D, the rotation angle of each interval becomes smaller from the n-th interval Pn to the first interval P1.

Table 1 illustrates a case where, according to the present invention, the hard disc D is divided into three regions such as an outer data (OD) region, a middle data (MD) region, and an inner data (ID) region, along the radius of the hard disc D, and the rotation angle of the head 44 varied in accordance with each region becomes smaller from the OD region to the ID region.

TABLE 1

| Intervals | Track density (TPI) | Track number | Rotation angle (μrad) |
|---|---|---|---|
| OD | 52000 | 0-17167 | 4.893101 |
| MD | 55000 | 17168-39167 | 4.626205 |
| ID | 57500 | 39168-111999 | 4.425066 |

In this way, in order to determine the rotation angle at each interval of the hard disc D, preferably, an optimum track density at each interval is first calculated. The optimum track density at each interval is determined, the rotation angle to record the servo data is then determined by the optimum track density, and the servo data is recorded on each interval on the basis of the determined rotation angle, and thereby the servo data can be recorded on the hard disc D so that servo bursts do not overlap even in either region where the skew angles of the hard disc D are different.

In Table 1, the "track density" represents the optimum track density that is calculated at each interval. For example, the optimum track density is calculated as 52000 TPI in the OD region, and thus, the rotation angle of the head 44 to record the servo data in the OD region is 4.893101 micro radian (μrad). The rotation angles in the MD and ID regions are determined by the optimum track density in each of the MD and ID regions.

As presented above, when the servo data is recorded on the hard disc D, or when the data recorded on the disc D is read, other regions of the hard disc D having different skew angle can be accessed with the same margin as the access margin of the head 44 in a position where the skew angle is 0, and thus, defects such as an increase in the value of a position error signal (PES) due to the lack of a head margin, caused by a decrease in the track pitch in a head access step, can be prevented.

While this invention has been particularly shown and described with reference to embodiments thereof, the invention must be interpreted only as an example of preferred embodiments. For example, those skilled in the art can measure a skew angle where servo bursts begin to appear, can record servo data on a hard disc while rotating a head at an angle smaller than the skew angle through a conventional method, and can record servo data on the hard disc by varying the rotation angle of the head at each interval only in a region of the hard disc having an angle larger than the skew angle, on the basis of the technical spirit of the present invention. For this reason, the scope of the present invention is not defined by the embodiments therein but by the appended claims and equivalents thereof.

As described above, in the method of recording servo data according to the present invention, when the servo data is recorded on a hard disc on which high-density data can be recorded, for example, in each region of a hard disc drive (HDD), the optimum track density in each region of the hard disc is calculated, and then, the rotation angle of the head for each region is determined such that the calculated optimum track density exists in each region. The head is then rotated at the determined rotation angle, and thereby the servo data are recorded in each region. In addition, the servo data is recorded in each region such that the optimized track pitch is obtained. Thus, when the head accesses the hard disc to record or read recorded data, the head margin for each region of the hard disc becomes uniform, and thus, defects occurring when the conventional methods of recording servo data are used, for example, an increase in the value of the PES due to servo burst overlap between adjacent tracks caused by a narrow track pitch in the OD region of the hard disc, can be omitted.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording servo data on a high-density disc while rotating an actuator head within a predetermined skew angle of the disc, comprising:

varying the rotation angle of the actuator head according to the skew angle of the actuator head;

dividing the high-density disc into a plurality of intervals in the direction of a radius of the high-density disc and calculating an optimum track density (tracks per inch; TPI) at each interval;

determining the rotation angle of the actuator head at each interval such that the track density at each interval coincides with the calculated optimum track density; and rotating the actuator head at the determined rotation angle and recording the servo data at each interval.

2. The method of claim 1, further comprising increasing the rotation angle of the actuator head at an interval where the skew angle of the actuator head is large and decreasing the rotation angle of the actuator head at an interval where the skew angle of the actuator head is small while the servo data is recorded.

3. The method of claim 2, further comprising:

sequentially reducing the rotation angle of the actuator head when the servo data is recorded from an outer data region of the high-density disc to an inner data region of the high-density disc, and sequentially increasing the rotation angle of the actuator head in an opposite case.

4. A method of recording servo data on a high-density disc while rotating an actuator head within a predetermined skew angle of the disc, comprising:

decreasing the rotation speed of the actuator head as the actuator head moves from the outer part of the high-density disc to the inner part of the high-density disc;

dividing the high-density disc into a plurality of intervals in the direction of a radius of the high-density disc and calculating an optimum track density (tracks per inch; TPI) at each interval;

determining the rotation angle of the actuator head at each interval such that the track density at each interval coincides with the calculated optimum track density; and rotating the actuator head at the determined rotation angle and recording the servo data at each interval.

* * * * *

UNITED STATES PATENT AND TRADEMARK OFFICE
CERTIFICATE OF CORRECTION

PATENT NO. : 7,023,644 B2
APPLICATION NO. : 10/242058
DATED : April 4, 2006
INVENTOR(S) : Robert Michael Crone, Gordon James Smith and Wing Tsang Tang It is certified that error appears in the above-identified patent and that said Letters Patent is hereby corrected as shown below:

Column 1
line 32, between the words "equalize" and "so", delete the word "to".

Column 3
line 50, after the word "may", insert the word --be--.
line 61, between the words "equalize" and "so", delete the word "to".

Column 5
line 16, change the word "expose" to --exposed--.
line 20, after the word "require", delete the word "an".
line 23, after the word "time", delete the word "an".
line 52, after the word "may", insert the word --be--.

Column 8
line 10, change the word "are" to --is--.

Signed and Sealed this

Twenty-second Day of August, 2006

JON W. DUDAS
*Director of the United States Patent and Trademark Office*